(12) United States Patent
Maass et al.

(10) Patent No.: US 7,670,111 B2
(45) Date of Patent: Mar. 2, 2010

(54) SEAL

(75) Inventors: Raimund Maass, Erkelenz (DE); Juergen Kurth, Odenthal (DE)

(73) Assignee: AB SKF, Gothenburg (SE)

( * ) Notice: Subject to any disclaimer, the term of this patent is extended or adjusted under 35 U.S.C. 154(b) by 623 days.

(21) Appl. No.: 11/435,836

(22) Filed: May 18, 2006

(65) Prior Publication Data

US 2006/0269407 A1 Nov. 30, 2006

(30) Foreign Application Priority Data

May 25, 2005 (DE) .................... 10 2005 024 006

(51) Int. Cl.
*F04D 29/10* (2006.01)
(52) U.S. Cl. .................... 415/230; 277/549
(58) Field of Classification Search ............. 415/170.1, 415/230; 277/549
See application file for complete search history.

(56) References Cited

U.S. PATENT DOCUMENTS

| | | | |
|---|---|---|---|
| 5,860,656 A * | 1/1999 | Obata et al. ................. | 277/559 |
| 6,209,879 B1 | 4/2001 | Mizunoya et al. | |
| 6,279,914 B1 | 8/2001 | Yamanaka et al. | |
| 6,513,810 B1 | 2/2003 | Pataille | |
| 6,543,786 B2 * | 4/2003 | Osumi et al. ................. | 277/549 |
| 6,840,521 B2 * | 1/2005 | Ikeda .......................... | 277/551 |
| 2001/0030398 A1 * | 10/2001 | Hosokawa et al. .......... | 277/549 |
| 2002/0182072 A1 * | 12/2002 | Kato et al. ................... | 415/231 |
| 2003/0025276 A1 * | 2/2003 | Kato et al. ................... | 277/549 |
| 2003/0057657 A1 * | 3/2003 | Hosokawa et al. .......... | 277/549 |
| 2003/0138332 A1 * | 7/2003 | Osako et al. ................. | 417/269 |
| 2003/0209860 A1 | 11/2003 | Kammerer et al. | |
| 2004/0130101 A1 * | 7/2004 | Osako et al. ................. | 277/549 |
| 2004/0173973 A1 * | 9/2004 | Kammerer et al. .......... | 277/549 |
| 2004/0188950 A1 * | 9/2004 | Guillerme et al. .......... | 277/549 |

(Continued)

FOREIGN PATENT DOCUMENTS

DE 36 40 346 A1 6/1988

(Continued)

OTHER PUBLICATIONS

German Office Action dated Feb. 19, 2009 issued in corresponding application with Partial English Translation.

(Continued)

*Primary Examiner*—Edward Look
*Assistant Examiner*—Aaron R Eastman
(74) *Attorney, Agent, or Firm*—Buchanan, Ingersoll & Rooney, PC

(57) ABSTRACT

A seal for a compressor for sealing a shaft includes a first seal part of a first material, a second seal part of a second material different from the first material, and a stiffening part. The second seal part is connected at least with a radially extending surface area to at least one of the other parts and the surface area of the second seal part opposite the aforementioned surface area is kept from making contact with the stiffening part. The first seal part is provided, toward the axial side, with a sealing lip which is adapted for sealing contact with the shaft, and the second seal part is made such that the radially inner area of the second seal part extends axially and is free from collision with the sealing lip when the seal is properly installed.

18 Claims, 1 Drawing Sheet

U.S. PATENT DOCUMENTS

2004/0201179 A1  10/2004  Iwakata et al.
2004/0239041 A1* 12/2004  Morimoto et al. ........... 277/549

FOREIGN PATENT DOCUMENTS

| | | |
|---|---|---|
| DE | 102 24 175 A1 | 4/2003 |
| JP | 54-118556 U | 8/1979 |
| JP | 62-233569 A | 10/1987 |
| JP | 5-57520 U | 7/1993 |
| JP | 5-57523 U | 7/1993 |
| JP | 6-73383 U | 10/1994 |
| JP | 7-139634 A | 5/1995 |
| JP | 9-303568 A | 11/1997 |
| JP | 11-125337 A | 5/1999 |
| JP | 11-248005 A | 9/1999 |
| JP | 2000-320689 A | 11/2000 |
| JP | 2001-187970 A | 7/2001 |
| JP | 2002-364761 A | 12/2002 |
| JP | 2003-301948 A | 10/2003 |
| JP | 2004-19798 A | 1/2004 |
| JP | 2004-316681 A | 11/2004 |

OTHER PUBLICATIONS

English translation of Notification of Rejection issued Nov. 18, 2008 in corresponding Japanese Application No. 2002-138599.
English translation of Decision of Refusal issued Apr. 21, 2009 in corresponding Japanese Application No. 2006-138599.

* cited by examiner

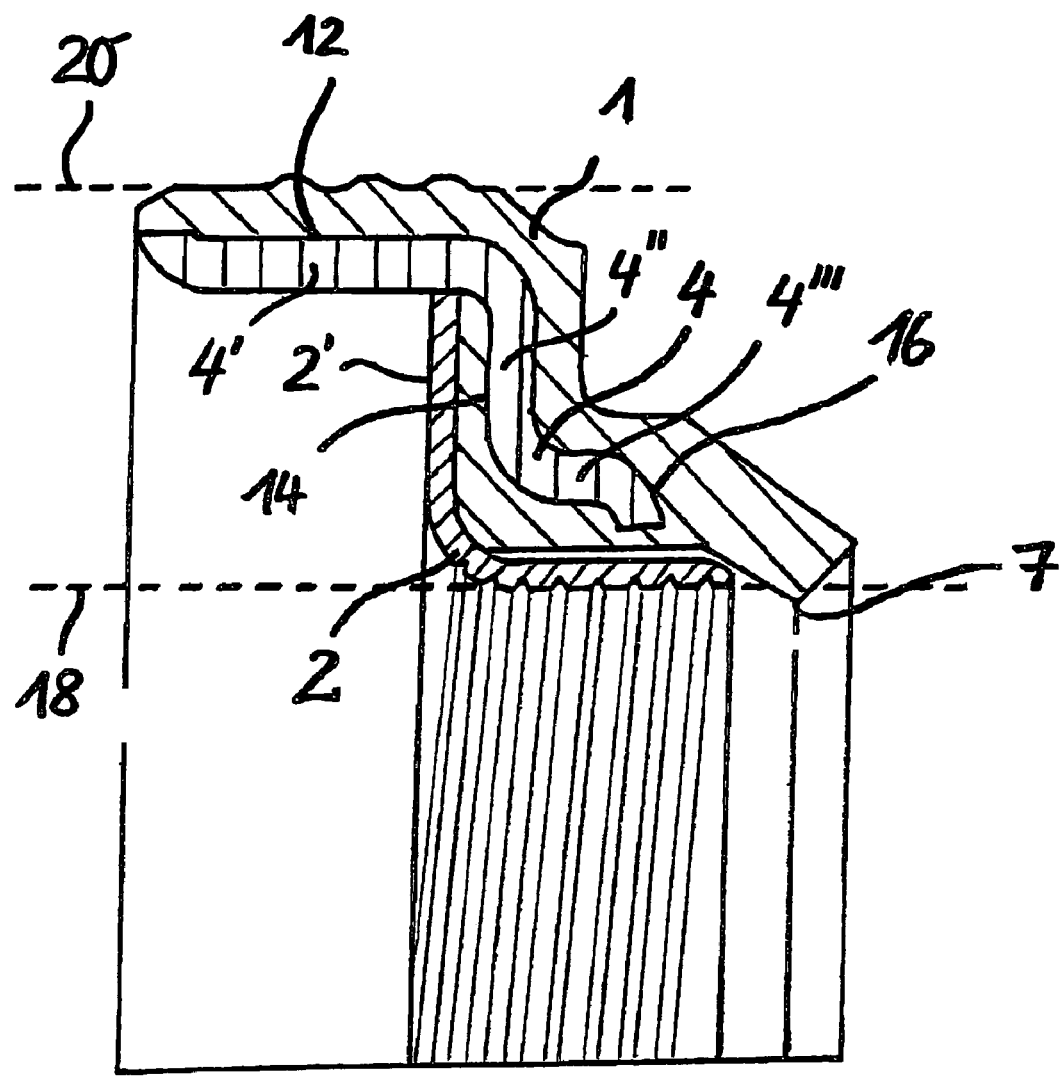

SEAL

FIELD OF THE INVENTION

The invention generally relates to seals. More particularly, the invention pertains to a seal for a compressor for sealing a shaft.

BACKGROUND DISCUSSION

DE 102 24 175 A1 discloses a seal arrangement, specifically a lip seal, for sealing the intermediate space around the drive shaft of a compressor for use in an air conditioning system. The seal arrangement includes a stiff base element and an elastic element which adheres to the base element such that the elastic element covers essentially the entire surface of the base element. In addition to the elastic element, the seal arrangement includes a second seal element of PTFE which is supported by a backup ring. The second seal element is clamped so-to-speak between the backup ring and the elastic element.

SUMMARY

A seal in a compressor for sealing a shaft of the compressor comprises a first seal part of a first material that is adapted to engage a housing of the compressor, a second seal part of a second material different from the first material, and a stiffening part of a third material different from the first and second materials. The first seal part includes, toward the axial side of the first seal part, a sealing lip adapted to sealingly contact the shaft. The second seal part possesses oppositely facing and radially extending first and second surfaces, with the radially extending first surface of the second seal part being fixed to a radially extending surface of the first seal part, and with the radially extending second surface of the second seal part being exposed along its entire radial extent. The second seal part includes a radially inner area extending axially toward the sealing lip and adapted to sealingly engage the shaft when the seal is properly installed, with the radially inner area of the second seal part which extends axially towards the sealing lip being spaced from the sealing lip so that an axial end of the radially inner area of the second seal part does not contact the sealing lip when the seal is properly installed.

According to another aspect, a seal for a compressor for sealing a shaft of the compressor comprises a first seal part of a first material, a second seal part of a second material different from the first material, and a stiffening part. The second seal part is connected at least with a radially extending surface area of at least one of the first seal part and the stiffening part, with the surface area of the second seal part opposite the aforementioned surface area being kept from making contact with the stiffening part. The first seal part includes, toward an axial side of the first seal part, a sealing lip adapted to sealingly contact the shaft, and the second seal part includes a radially inner area extending axially toward the axial side of the first seal part and free from collision with the sealing lip when the seal is properly installed.

With the seal construction described here, the backup ring can be advantageously omitted, yet at least the same sealing effectiveness can be realized. Thus the parts necessary for achieving the necessary sealing effectiveness can be reduced. This result can be achieved in a particularly advantageous manner with a chemical connection of the first and second sealing parts. At the same time the chemical connection between the first and second seal parts furthermore advantageously prevents bypass leakage, for example of refrigerants, between the two sealing parts.

BRIEF DESCRIPTION OF THE DRAWING FIGURE

The drawing FIGURE illustrates, in cross-section through the upper half of the seal, an embodiment of the seal disclosed herein.

DETAILED DESCRIPTION

FIG. 1 illustrates one embodiment of a seal disclosed herein, with the upper half of the seal being shown in cross-section as if it were located as intended on the shaft 18 of the compressor which is intended to be sealed and which is designed to turn. In this connection for example a compressor space filled by a refrigerant and a lubricant extends on the right side of the seal. The seal prevents the refrigerant and/or lubricant from being able to penetrate into the left-hand space and also prevents for example dirt from being able to penetrate from the left-hand space into the right-hand space which is filled by refrigerant and/or lubricant.

Generally speaking, the seal comprises three sections, namely an outer hollow cylindrical (cylinder-like) section 12, a perforated disk (disk-like or ring-like) section 14 and an inner hollow cylindrical (cylinder-like) section 16. The outside jacket or outside surface of the outer hollow cylindrical section 12 is adapted to adjoin a correspondingly made opening of a compressor housing (schematically indicated at 20). As illustrated, the cylindrical section 12 extends generally in the axial direction. The right axial end of the outer hollow cylindrical section 12 is connected to the inside of the perforated disk section 14 so that the radially outer end of the disk section 14 is connected to the axial end of the cylindrical section 12. The disk section 14 is connected on its inside edge (radially inner end) to an inner hollow cylindrical section 16 which extends toward the right side generally in the axial direction. Thus, the inner hollow cylindrical section 16 is connected to the inside edge of the perforated disk section 14 and extends away from the outer hollow cylindrical section 12 when the seal is installed properly.

The seal comprises a first seal part 1 of elastomer material, a second seal part 2 of polytetrafluorethylene (PTFE) and a stiffening part 4 made of metal. Thus, the first and second seal parts 1, 2, as well as the stiffening part 4, are made of different materials. The stiffening part 4 and the first seal part 1 are connected to one another by the corresponding vulcanization of the first seal part 1 to the stiffening part 4. In the perforated disk section 14 of the seal, an essentially radially extending surface area of the second seal part 2 is connected, chemically securely in the conventional manner, for example by vulcanization, to the corresponding surface area of the first seal part 1. The secure bond between the first and second seal part 1, 2 advantageously reliably prevents the second seal part 2 from being turned up in the direction to the left side by the process pressure prevailing on the right side.

As shown in the drawing FIGURE, the stiffening part includes an axially extending first portion 4', a radially extending second portion 4" and an axially extending third portion 4'''. The radially extending second portion 4" interconnects the axially extending first and third portions 4', 4'''. The axially extending third portion 4''' terminates at an end that is slightly radially inwardly directed as shown. In the illustrated embodiment, the radially outermost end of the second seal part 2 contacts the axially extending first portion 4' of the stiffening part 4.

In the outer hollow cylindrical section 12 of the seal, the hollow cylindrical area of the stiffening part 4 is surrounded by a likewise hollow cylindrical area of the first seal part 1. In the perforated disk section 14 of the seal, there is a likewise perforated disk area of the stiffening part 4 which is surrounded both to the left side and also to the right side by the first seal part 1. In the inner hollow cylindrical section 16 of the seal, there is an inner hollow cylindrical area of the stiffening part 4 which is surrounded essentially on all sides by the first seal part 1. The first seal part 1 is made, in the inner hollow cylindrical section 16 of the seal, with a sealing lip 7 which is designed to adjoin the shaft (schematically indicated at 18) and thus forms a seal. As shown in the drawing FIGURE, the axially extending inner area of the second seal part 2, in the area of the hollow cylindrical section 16 of the seal, is not connected to the first seal part 1. Here, the axially extending inner area of the second seal part 2 is spaced from the first seal part 1 so that the inner area of the second seal part extends in a cantilever manner. In addition, as noted above, a radially extending (axially facing) surface of the second seal part 2 is connected to a radially extending (axially facing) surface of the first seal part 1. The surface 2' of the second seal part 2 opposite the aforementioned radially extending surface is not covered (i.e., is an exposed surface or a free surface). Thus, the surface 2' of the second seal part 2 is not in contact with or supported by any type of stiffening device such as a back-up ring.

When the seal is properly installed on the shaft 18, within the hollow cylindrical section 16 of the seal, the inner area of the second seal part 2 not connected to the first seal part 1 extends generally axially in the manner of a hollow cylinder toward the right side. In this connection, the second seal part 2 is dimensioned such that when the seal is properly installed, the inner hollow cylindrical area of the second seal part 2 does not contact or come into conflict with the sealing lip 7 of the first seal part 1. It is to be understood that when the seal is properly installed, the sealing lip 7 is actually deformed somewhat from the position shown in the drawing FIGURE so that both the sealing lip 7 and the generally axially extending portion of the second seal part contact the outer surface of the shaft 18.

The inner hollow cylindrical section and also the perforated disk area of the stiffening part 4 shield the second seal part 2 against the process pressure present in the right-hand space and advantageously support the first seal part 1 for sealing contact of its sealing lip 7 with the shaft. In doing so, the sealing lip 7 of the first seal part 1 is supported by the second seal part 2 using its good sliding properties and undue deformation of the sealing lip 7, and premature wear based on the relative velocities and operating pressures which occur due to dry friction are inhibited and quite possibly prevented.

In one embodiment, the inner hollow cylindrical area of the second seal part 2 can be provided on its inner surface with a helical groove, as illustrated in the drawing FIGURE, in order to achieve a return action on the lubricant films which are present there.

The seal disclosed here by way of the illustrated and described embodiment provides an improved seal for a compressor that allows a relatively high sealing action to be achieved with a relatively simple and economical production capacity. The principles, preferred embodiment and mode of operation of the present invention have been described in the foregoing specification. The invention which is intended to be protected herein, however, is not to be construed as limited to the particular form disclosed, since this is to be regarded as illustrative rather than restrictive. Variations and changes may be made by those skilled in the art, and equivalents employed, without departing from the spirit of the invention.

What is claimed is:

1. A compressor seal for sealing a shaft of the compressor, comprising:
   a first seal part of a first material that is adapted to engage a housing of the compressor;
   a second seal part of a second material different from the first material;
   a stiffening part of a material different from the material of the first and second seal parts;
   the first seal part including, toward an axial side of the first seal part, a sealing lip adapted to sealingly contact the shaft;
   the second seal part possessing oppositely facing and radially extending first and second surfaces, the radially extending first surface of the second seal part being fixed to a radially extending surface of the first seal part;
   the radially extending second surface of the second seal part being exposed along its entire radial extent;
   the second seal part including a radially inner area extending axially toward the sealing lip and adapted to engage the shaft when the compressor seal is properly installed;
   the radially inner area of the second seal part which extends axially towards the sealing lip being spaced from the sealing lip so that an axial end of the radially inner area of the second seal part does not contact the sealing lip when the compressor seal is properly installed;
   wherein the compressor seal comprises an outer hollow cylindrical section, a perforated disk section connected to an axial end of the outer hollow cylindrical section and extending radially inwardly, and an inner hollow cylindrical section connected to an inside edge of the perforated disk section and extending away from the outer section when the compressor seal is installed properly.

2. The compressor seal according to claim 1, wherein the radially extending first surface of the second seal part is vulcanized to the radially extending surface of the first seal part.

3. The compressor seal according to claim 1, wherein a radially outermost end of the second seal part contacts the stiffening part.

4. The compressor seal according to claim 1, wherein the stiffening part includes an axially extending first portion, a radially extending second portion and an axially extending third portion, with the radially extending second portion interconnecting the axially extending first and third portions.

5. The compressor seal according to claim 1, wherein the first seal part is vulcanized to the stiffening part.

6. A compressor seal for sealing a shaft of the compressor, comprising:
   a first seal part of a first material;
   a second seat part of a second material different from the first material, the second seal part possessing oppositely facing and radially extending first and second surfaces;
   a stiffening part;
   the second seal part is connected at least with a radially extending surface area of at least one of the first seal part and the stiffening part, the radially extending first surface of the second seal part being opposite the aforementioned surface area and being kept from making contact with the stiffening part,
   the radially extending second surface of the second seal part being exposed along its entire radial extent; and the first seal part includes, toward an axial side of the first seal part, a sealing lip adapted to sealingly contact the shaft; and the second seal part including a radially inner area extending axially toward the axial side of the first seal part and free from collision with the sealing lip when the compressor seal is properly installed;

wherein the compressor seal comprises an outer hollow cylindrical section, a perforated disk section connected to an axial end of the outer hollow cylindrical section and extending radially inwardly, and an inner hollow cylindrical section connected to an inside edge of the perforated disk section and extending away from the outer section when the compressor seal is installed properly.

7. The compressor seal according to claim 6, wherein the second seal part is connected to the first seal part.

8. The compressor seal according to claim 6, wherein the second material is polytetrafluorethylene (PTFE).

9. The compressor seal according to claim 6, wherein the first material is an elastomer material.

10. The compressor seal according to claim 6, wherein the first seal part is vulcanized to the stiffening part.

11. The compressor seal according to claim 6, wherein the stiffening part is made from a metal.

12. The compressor seal according to claim 6, wherein the outer hollow cylindrical section of the compressor seal comprises a hollow cylindrical area of the stiffening part which possesses an outer surface that is connected to a hollow cylindrical area of the first seal part.

13. The compressor seal according to claim 6, wherein the perforated disk section of the compressor seal comprises a perforated disk area of the stiffening part which is completely surrounded by the first seal part.

14. The compressor seal according to claim 6, wherein the second seal part is connected to the first seal part in the perforated disk section of the compressor seal.

15. The compressor seal according to claim 6, wherein the inner hollow cylindrical section of the compressor seal comprises a hollow cylindrical area of the stiffening part which is completely surrounded by the first seal part.

16. The compressor seal according to claim 6, wherein the first seal part forms the sealing lip in the inner hollow cylindrical section of the compressor seal.

17. The compressor seal according to claim 6, wherein when the compressor seal is properly installed, the second seal part extends axially, in the inner hollow cylindrical section of the compressor seal, as a hollow cylinder free of a fixed connection to the first seal part.

18. The compressor seal according to claim 17, wherein an inside surface of the second seal part is provided with a helical groove.

* * * * *